Figure 1:
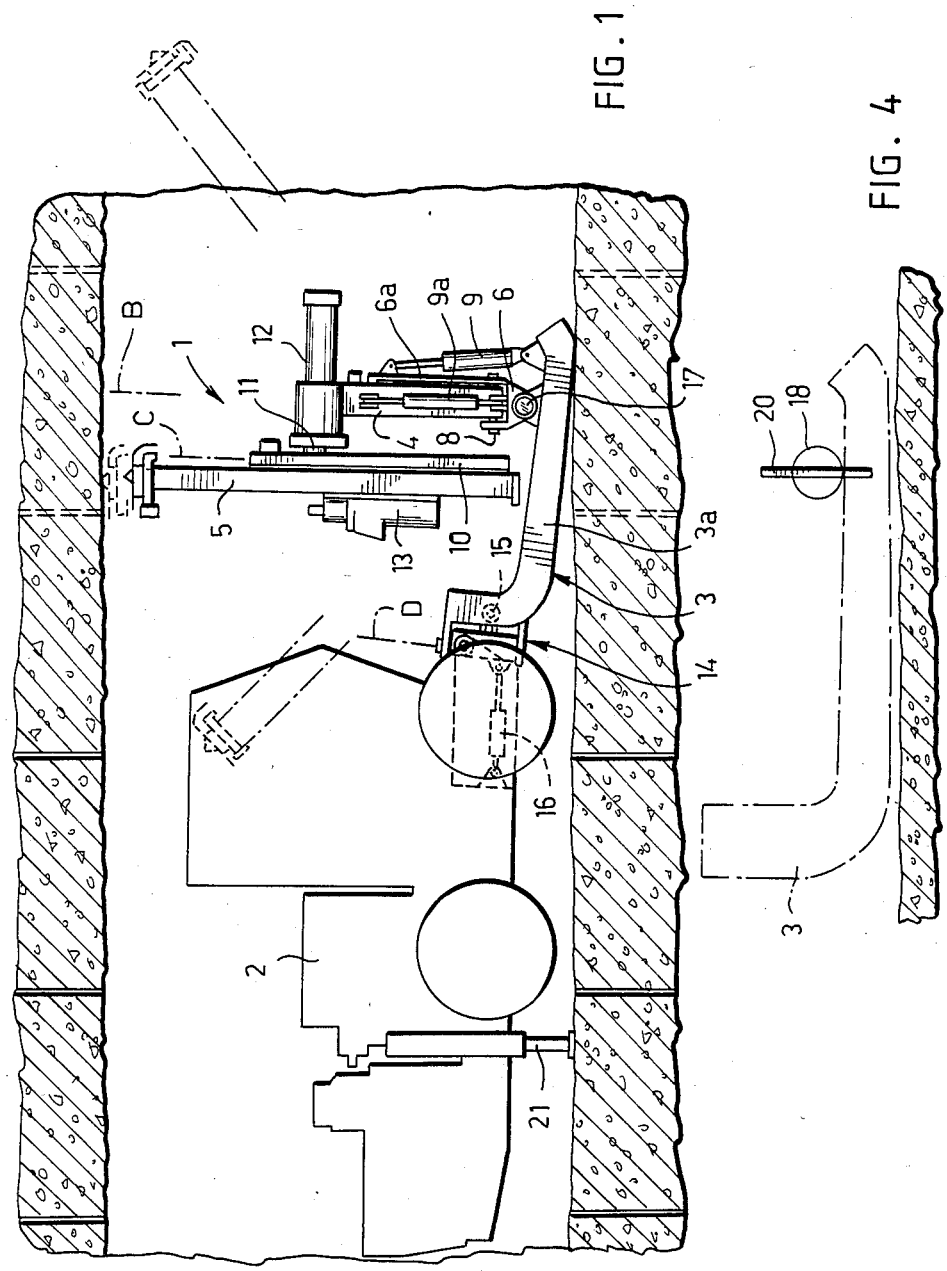

United States Patent [19]

Rajakallio et al.

[11] Patent Number: 4,586,571

[45] Date of Patent: May 6, 1986

[54] METHOD OF AND ARRANGEMENT FOR POSITIONING OF A DRILLING APPARATUS

[75] Inventors: Pauli Rajakallio; Pentti Hyvönen, both of Tampere, Finland

[73] Assignee: Oy Tampella AB, Tampere, Finland

[21] Appl. No.: 643,004

[22] Filed: Aug. 21, 1984

[30] Foreign Application Priority Data

Sep. 2, 1983 [FI] Finland .................................. 833145

[51] Int. Cl.⁴ ................................................ E21C 9/00
[52] U.S. Cl. ........................................ 173/43; 173/39; 173/20; 33/185 V
[58] Field of Search ........................ 173/20, 22, 39, 42, 173/23, 43, 45; 299/1; 175/41, 45, 40; 33/263, 264, 286, 275 R, 185 V; 356/399; 408/16

[56] References Cited

U.S. PATENT DOCUMENTS

| | | | |
|---|---|---|---|
| 3,181,624 | 5/1965 | Lindberg | 173/23 |
| 3,998,554 | 12/1976 | Burch et al. | 356/399 |
| 4,142,798 | 3/1979 | Barbee, Jr. | 33/286 |

Primary Examiner—Donald R. Schran
Assistant Examiner—James L. Wolfe
Attorney, Agent, or Firm—Ladas & Parry

[57] ABSTRACT

The present invention relates to a method and an apparatus for positioning a drilling apparatus with respect to a drilling plane formed by holes to be drilled in a rock in a tunnel. Light beams pointing in opposite directions are developed and fixed with respect to the drilling unit and are directed towards marks on the tunnel walls by adjusting the base of the apparatus in a horizontal plane.

7 Claims, 4 Drawing Figures

METHOD OF AND ARRANGEMENT FOR POSITIONING OF A DRILLING APPARATUS

The present invention relates to a method of positioning of a drilling apparatus with respect to a drilling plane formed by holes to be drilled in a rock in a tunnel, according to which method a base of the drilling apparatus is moved to the place of the drilling plane and is positioned on the basis of marks made on the tunnel walls.

In underground excavations bores are drilled in the rock in a tunnel, which bores usually are positioned in groups in the shape of a fan in planes transverse to the longitudinal axis of the tunnel, which planes in turn are positioned at a distance from each other in the longitudinal direction of the tunnel. In order to secure that the planes formed by the bores of the fans are positioned at desired places in the tunnel, it is essential to get the drilling apparatus reliably adjusted in the right position as regards the drilling plane of the fan by means of marks painted on the tunnel walls before the adjusting steps required for the feed device of the drilling apparatus can be taken.

In known drilling apparatuses the positioning is carried out by checking the position of the apparatus by means of the feed device with respect to marks painted on both sides of the tunnel for indication of the position of the fan. Such an adjustment manner is difficult and time-consuming as well as inexact, because before checking, the base of the apparatus must be oriented with respect to the fan and adjusted horizontally by means of a water level. If when checking by means of the feed device it is observed that the position is incorrect, the whole positioning step must be repeated. The positioning is also made difficult by the fact that first the drilling apparatus must be moved roughly in the correct position and raised on ground supports as well as be adjusted in the horizontal plane before the exactness of the position can be checked by means of the feed device. If the position is not correct, the apparatus must be lowered to the ground, moved into a new position and again raised in a horizontal position on the ground supports for a new checking.

The object of the present invention is to provide a method which eliminates said drawbacks and simplifies the positioning of the apparatus. This object is achieved by the method according to the invention, which is characterized in that by developing light beams pointing in opposite directions and fixed as regards the drilling unit and by directing each light beam towards one of said marks by adjusting said base in a horizontal plane.

The invention is based on the idea that the positioning of the apparatus is carried out by means of light beams before lowering the base to the ground. Hereby the base is first moved to such a place that the light beams point near the marks painted on the tunnel walls. If the light beams do not hit the marks, the base is turned in the horizontal plane so that the straight line or plane formed by the light beams is parallel with the plane formed by the marks, i.e. both light beams are positioned equally far from the marks on the same side as the marks. After this the base is moved forwards or backwards by such a distance that the light beams hit the marks exactly. Only after this is the base lowered to the ground, whereby the position of the base is preserved and the feed device can be reliably adjusted as regards the drilling plane of the fan. With this method the positioning can be carried out quickly, simply and exactly.

An object of the invention is also an arrangement for carrying out the above described method and this arrangement is characterized in that the base is adjusted by moving the base along a straight line in said horizontal plane.

To provide known drilling apparatuses with an arrangement according to the invention requires only that the apparatuses are completed with simple light sources and a pivoting coupling means.

Figure 2:
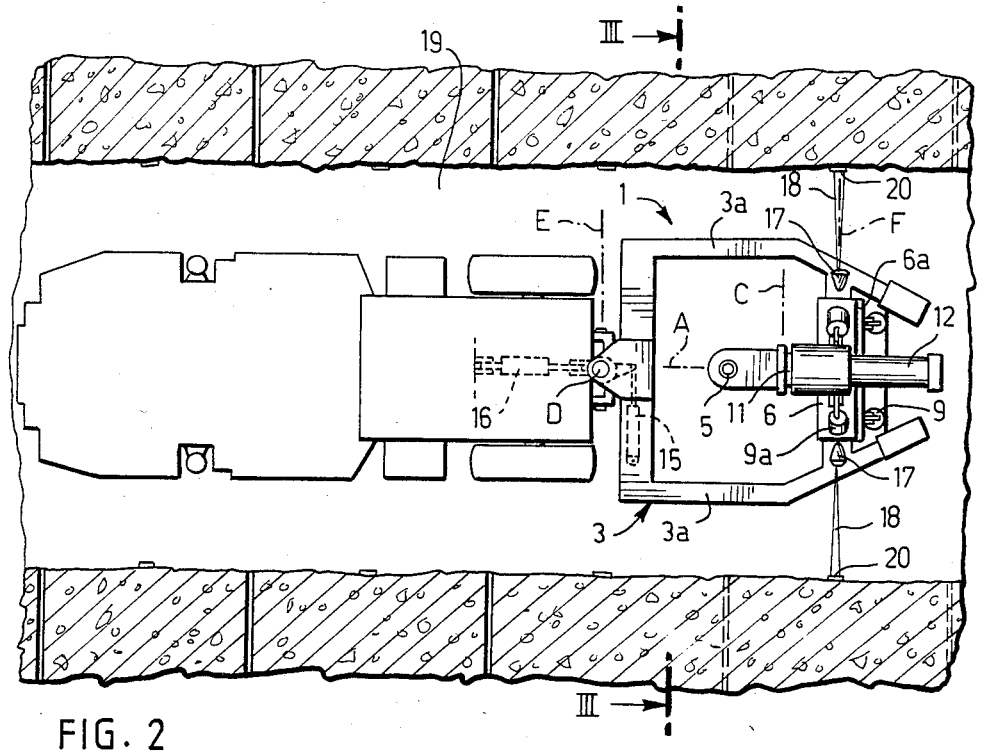
Figure 3:
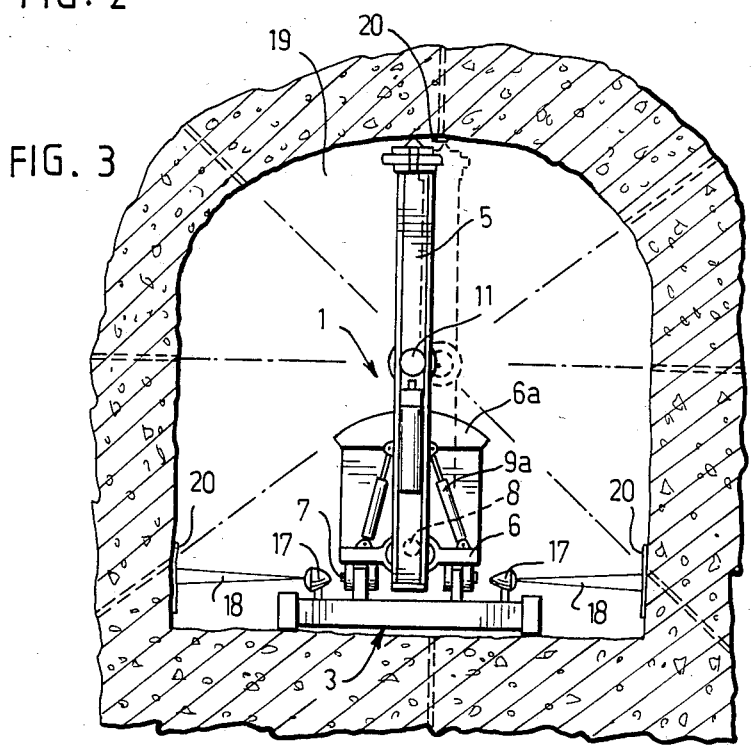

The invention is described in more detail in the following with reference to the enclosed drawings, wherein FIG. 1 is a side view of a drilling apparatus provided with an arrangement according to the invention, FIG. 2 is a top view of the drilling apparatus, FIG. 3 is a sectional end view of the drilling unit along line III—III in FIG. 2, and FIG. 4 is a schematical view on a larger scale of the adjusting principle.

The drilling apparatus illustrated in the drawings comprises a drilling unit 1 and a transport vehicle 2 moving on wheels to which the drilling unit is coupled. The drilling unit comprises a frame-like base 3 supporting a beam 4 supporting a feed device 5.

The base has two supporting arms 3a, 3b and a support 6 is pivoted on the base so that the support can turn in a longitudinal vertical plane A of the drilling unit, FIG. 2, around an inclination shaft 7 perpendicular to said plane. The beam 4 is pivoted on the support 6 so that the beam can turn in a transverse plane B of the drilling unit, FIG. 2, around a pivot shaft 8 perpendicular to the plane B. The beam is supported by a fixed guide 6a extending upwards from the support 6 and provided with slide bars. Between the guide and the base there are two pressure fluid cylinders 9 provided with locking valves and connected in parallel. The inclining of the guide and the beam around the inclination shaft 7 is carried out by means of said cylinders. Cross-connected pressure fluid operated cylinders 9a provided with locking valves are arranged between the beam and the support on both sides of the beam for pivoting of the beam around the pivot shaft 8.

A cradle 10 is pivoted on the upper end of the beam so that the cradle is pivotable in a transverse plane C of the drilling unit, FIG. 2, around a pivot shaft 11 perpendicular to this plane, which shaft is parallel with the pivot shaft 8 of the beam. At the upper end of the beam there is a pressure fluid operated rotation cylinder 12 for turning the cradle.

The feed device 5 for a drilling machine 13 is mounted slidable on the cradle so that the feed device is movable by means of an actuating device (not shown) in said transverse plane C of the cradle perpendicularly to the pivot shaft of the cradle.

The base is coupled to a vehicle by means of an articulated coupling 14 enabling the base to turn with respect to the vehicle around both a vertical axis D and a longitudinal horizontal axis E. Between a crosshead of the articulated coupling and the base a pressure fluid operated cylinder 15 is mounted for turning of the base around the vertical axis.

According to the invention light sources 17 are mounted on the base as extensions of the inclination shaft 7 of the beam support, which light sources point in opposite directions and send narrow, essentially horizontal light beams located on the same straight line F.

This straight line is parallel with the pivoting plane C of the feed device.

The arrangement operates in the following manner:

The drilling unit is moved with the transport vehicle to the fan to be drilled so that the light beams of the light point near the marks 20 painted on the tunnel walls 19, which marks define the place of the fan. The base is kept approximately vertical. If the light beams do not hit the marks, the base is turned by means of cylinder 15 around the vertical axis D so that the straight line formed by the light beams is parallel with the plane formed by the marks. After this the base is moved forwards or backwards, so that the light beams hit the marks. The drilling unit is now positioned in the right position as regards the fan to be drilled.

Next, ground supports 21 are pressed against the ground simultaneously as the base is pressed against the ground with the cylinder 16, as shown in FIG. 1. After this there is no need to further adjust the feed device in the transverse direction of the fan.

Finally the feed device is inclined according to the inclination angle of the fan by inclining the beam around the inclination shaft 7 with the cylinders 9 and the feed device is turned around the pivot shaft 11 with cylinders 12 in the desired drilling direction. The displacement of the pivot shaft 11 of the feed device to the drilling centre of the fan is carried out, when desired, by turning the beam around the pivot shaft 8 with cylinders 9a. The inclining and turning of the beam and the feed device are controlled preferably by an angle measuring sensor by using an arrangement shown in Applicant's co-pending application filed simultaneously with this application.

The drawings and description relating thereto are intended only to illustrate the idea of the invention. As to the details the method and the arrangement according to the invention may vary within the scope of the claims. Even if above two different light sources have been mentioned it is possible in some structures to use only one light source sending narrow light beams in opposite directions. It is also possible to use several light sources to point in the same direction. Instead of a linelike light beam, a dot-like light beam or several dot-like lights on the same straight line can be used, etc. The light sources can be fixed to other appropriate places than the base.

I claim:

1. A method of positioning a drilling apparatus with respect to a drilling plane formed by holes to be drilled in a rock in a tunnel, according to a method which comprises the steps of placing marks on walls of the tunnel indicating a drilling plane;

moving a base of the drilling apparatus to the place of the drilling plane, and positioning the base with reference to the marks made on the tunnel walls, characterized by the steps of developing light beams pointing in opposite directions from means fixed regarding the drilling apparatus, and directing each light beam towards one of said marks by adjusting said base in a horizontal plane.

2. A method according to claim 1, characterized by the step of adjusting the base (3) by turning the base in said horizontal plane around a vertical axis (D).

3. A method according to claim 1, characterized the step of adjusting the base (3) by moving the base along a straight line in said horizontal plane.

4. An arrangement for positioning of a drilling apparatus with respect to a drilling plane formed by holes to be drilled in a rock in a tunnel, which drilling apparatus (1,2) comprises a base (3) provided with a coupling means (14) for coupling the base to a transport vehicle (9) and a drill rig (4,5,13) supported by the base, characterized in that the apparatus is provided with at least one stationary mounted light source (17) for sending narrow light beams (18) in opposite directions, and that the coupling means (14) forms a pivot joint enabling the base to turn with respect to the transport vehicle (2) around a vertical axis (D).

5. An arrangement according to claim 4, characterized in that the light beams (18) are positioned in the same vertical plane.

6. An arrangement according to claim 4, in which the drill rig (4,5,13) comprises a beam (4) mounted on the base (3) pivotably around an inclination shaft (7) and around a pivot shaft (8) positioned in a plane perpendicular to said inclination shaft, and a feed device (5) for a drilling machine (13), which feed device is mounted in the beam pivotably around a pivot shaft (11) parallel with the pivot shaft (8) of the beam, characterized in that two light sources (17) are provided on opposite sides of the beam (4) to be positioned on the extensions of said inclination shaft (7) of the beam (4).

7. An arrangement according to claim 6, characterized in that the light sources (17) are fixed to the base (3).

* * * * *